United States Patent
Sell et al.

(10) Patent No.: US 9,641,998 B2
(45) Date of Patent: May 2, 2017

(54) TECHNIQUE FOR PREPARING A ROAMING OPERATION OF A USER EQUIPMENT

(75) Inventors: Frank Sell, Vaals (NL); Andreas Witzel, Herzogenrath (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 404 days.

(21) Appl. No.: 14/353,087

(22) PCT Filed: Oct. 21, 2011

(86) PCT No.: PCT/EP2011/005334
§ 371 (c)(1),
(2), (4) Date: Apr. 21, 2014

(87) PCT Pub. No.: WO2013/056725
PCT Pub. Date: Apr. 25, 2013

(65) Prior Publication Data
US 2014/0248871 A1    Sep. 4, 2014

(51) Int. Cl.
*H04W 8/08*     (2009.01)
*H04W 8/12*     (2009.01)
(Continued)

(52) U.S. Cl.
CPC ............... *H04W 8/08* (2013.01); *H04W 8/12* (2013.01); *H04W 48/04* (2013.01); *H04W 48/18* (2013.01)

(58) Field of Classification Search
CPC ....................................................... H04W 8/08
(Continued)

(56) References Cited

U.S. PATENT DOCUMENTS 7,062,270 B1    6/2006  Dalvie et al.
2005/0176424 A1*  8/2005  Kumar ................... H04W 8/12
                                                       455/432.1
(Continued)

FOREIGN PATENT DOCUMENTS

FR          2 857 210 A1    1/2005
WO    WO 2010/076732 A1    7/2010

OTHER PUBLICATIONS

International Search Report and Written Opinion of the International Searching Authority, PCT Application No. PCT/EP2011/005334, May 24, 2012.
(Continued)

*Primary Examiner* — Muthuswamy Manoharan
(74) *Attorney, Agent, or Firm* — Sage Patent Group (57) ABSTRACT

Proposed is a technique for preparing a roaming operation of a User Equipment (UE) between a home network and at least one visited network. A method aspect being performed in a roaming control entity comprises receiving at least one message related to the roaming operation, determining if a roaming attempt from the home network to the at least one visited network is performed, and, if the determining step is affirmative, requesting, from the home network, information relating to the UE so as to evaluate if the UE has access to the home network. The method aspect being performed in the UE comprises transmitting the at least one message about the roaming attempt, and receiving, responsive to the transmitting, deny or grant of access of the UE to the at least one visited network depending on whether the UE has access to the home network or not.

19 Claims, 7 Drawing Sheets (1) Successful location update or call attempt
(2) location update or call attempt failure
(3) Location update request to visited network
In roaming controller: Initiate subscriber availability in home MNO
(4) Mobile Terminating SMS / MMS to subscriber, unsuccessful (51) Int. Cl.
  *H04W 48/18* (2009.01)
  *H04W 48/04* (2009.01)

(58) Field of Classification Search
  USPC ............................................. 455/432.1, 433
  See application file for complete search history.

(56) References Cited

U.S. PATENT DOCUMENTS

| | | | | |
|---|---|---|---|---|
| 2006/0135160 | A1* | 6/2006 | Jiang | H04W 8/04 |
| | | | | 455/435.1 |
| 2006/0135213 | A1* | 6/2006 | Jiang | H04W 4/20 |
| | | | | 455/566 |
| 2007/0093202 | A1* | 4/2007 | Hwang | H04W 48/14 |
| | | | | 455/3.06 |
| 2008/0194254 | A1* | 8/2008 | Balon | H04W 8/06 |
| | | | | 455/433 |
| 2009/0282251 | A1* | 11/2009 | Cook | H04L 63/062 |
| | | | | 713/171 |
| 2010/0323727 | A1* | 12/2010 | Russell | H04W 36/385 |
| | | | | 455/466 |
| 2011/0070902 | A1* | 3/2011 | Chen | H04W 4/14 |
| | | | | 455/466 |

OTHER PUBLICATIONS

International Preliminary Report on Patentability, PCT Application No. PCT/EP2011/005334, Jan. 15, 2014.

* cited by examiner

TECHNIQUE FOR PREPARING A ROAMING OPERATION OF A USER EQUIPMENT

CROSS REFERENCE TO RELATED APPLICATION

This application is a 35 U.S.C. §371 national stage application of PCT International Application No. PCT/EP2011/005334, filed on 21 Oct. 2011, the disclosure and content of which is incorporated by reference herein in its entirety. The above-referenced PCT International Application was published in the English language as International Publication No. WO 2013/056725 A1 on 25 Apr. 2013.

TECHNICAL FIELD

The present disclosure generally relates to roaming in mobile networks. In particular a technique for preparing a roaming operation of a User Equipment (UE) is described.

BACKGROUND

Inter network roaming is considered an essential element of mobile networks, and allows a mobile subscriber via his/her UE to make use of mobile services outside of the radio coverage of the associated home service provider, for example when traveling outside the home country.

Many technologies and solutions exist, which facilitate the roaming between a home network and a visited network. Mobile Network Operators (MNOs) may contract agreements to allow roaming. Accordingly, the MNOs may set up the technical means to realize the roaming either directly, that means from MNO to MNO, or by making use of roaming services which enable roaming through a dedicated roaming infrastructure, which may or may not be operated by a third party or, for example, by an MNO who may offer services in more than one country.

In some scenarios, no such roaming agreements may exist between MNOs, but for exceptional situations a temporary roaming should still be possible. One example is the national roaming for competing MNOs, which normally do not allow subscribers of the competitor's network to roam to their own network. However, assuming an emergency situation, such as a car breaking down in an area with very low or no radio coverage of the home MNO of a given UE, the driver using that UE may have no possibility to use an alternative network, unless the driver maintains multiple subscriptions. On the other hand, the driver may not be allowed to exploit emergency functionalities, since those functionalities might be reserved for more severe emergencies (for example, a state of national emergency, such as an earthquake or a tsunami, or at least states of emergency involving injury to persons).

One reason that national roaming (e.g., if the UE is still in the subscriber's home country but has no or insufficient radio coverage for its designated MNO) may not be allowed resides in the fact that a mobile subscribers with a given UEs might roam accidentally, simply because radio coverage from the home network of the given UE is not as good as radio coverage from non-home networks. As a disadvantage for the designated MNO, that MNO may lose revenue; on the other hand, as a disadvantage for the subscriber, the subscriber may disagree with extra roaming fees liable for using a non-home MNO, or may at least wish to be warned about those extra roaming fees prior to consenting to such a roaming operation.

SUMMARY

There is a need for allowing a better control of roaming operations.

In a first aspect, a method for preparing a roaming operation of a UE between a home network and at least one visited network is provided, the method being performed in a roaming control entity and comprising the steps of receiving at least one message related to the roaming operation, determining if a roaming attempt from the home network to the at least one visited network is performed, and, if the determining step is affirmative, requesting, from the home network, information relating to the UE so as to evaluate if the UE has access to the home network.

The first aspect may, for example, enable inter-MNO roaming under the prerequisite that a UE is not able to access services from its own (home) MNO, but has access to another MNO's network.

In the first aspect, after the requesting step, access of the UE to the at least one visited network may be denied when the UE has access to the home network. On the other hand, after the requesting step, access of the UE to the at least one visited network may be granted when the UE has no access to the home network. Accordingly, if the UE is able to access services from its home MNO network, roaming may be prevented.

Further, the granting step may be made conditional on a corresponding setting of UE data (e.g., by the associated subscriber). In this case, the subscriber can, for example, be sure that he/she is not surprised by an unwanted roaming operation while he/she is not bothered with frequent requests for roaming authorization.

Further, at least the steps of determining and requesting may be performed under the prerequisite that a plurality of mobile networks with overlapping service areas is predefined, and wherein the plurality of mobile networks comprises the home and at least one visited networks. In one realization, this prerequisite can make sure that the above-defined conditional roaming is only performed it the subscribing UE is given a choice of plural MNOs to which roaming may be performed.

Moreover, the message related to roaming may be a location update message. This approach allows for re-using existing functionalities.

Still further, the requesting step may comprise determining whether the UE has the possibility to access mobile services in the home network. In this case, the requesting step may comprise requesting information on whether the UE is reachable from the home network. This implementation can optionally be exploited for a simple test so as to decide whether the UE in question might be a roaming candidate or not.

In a first alternative, the requesting step may comprise transmitting a Short Message Service, SMS, message to the home network. In this case, the alternative may further comprise connecting to a home SMS service center, and deriving a status of the UE depending on a delivery success result from the home SMS center. Thus, the connecting step may be performed by transmitting an SMS message containing binary coded information or by transmitting a flash SMS. Further, failure of delivery of the SMS message may indicate non-accessibility of the home network by the UE. In the latter event, failure of delivery may be indicated by elapsing of a predetermined time period from the SMS message transmittal without receiving any response. In this case, the UE may be granted access to the at least one visited network when failure of delivery is indicated. Conversely, successful delivery of the SMS message may indicate accessibility of the home network by the UE. It is to be noted that instead of the SMS, also a multimedia message service, MMS, message (also sometimes referred to "MMS" hereinbelow) may be used, since for the purpose of the present invention, content of the message is less important than successful/unsuccessful delivery of the message itself.

In the granting step, the UE may be informed that the roaming attempt will be rejected. In this event, responsive to the rejection, an answer SMS message may be received from the UE requesting enforced roaming from the home network to the at least one visited network. Further in the latter event, responsive to the request for enforced roaming, information may be transmitted that indicate that roaming to the at least one visited network will result in additional mobile service charges. With such a behavior, the subscriber has the option to disagree with extra roaming fees liable for using a non-home MNO, and may at least be warned about those extra roaming fees prior to giving or declining his/her consent to such a roaming operation.

In a second alternative, the requesting step may be involved in performing at least one positioning procedure with the home network. Further, a query from the home network of the subscriber position may be initiated, and paging of the UE may be initiated. In that case, the query step may, for example, be performed via a Mobile Application Part, MAP, message Provide Subscriber Location, and/or the paging step may be performed in the last known location area or the last known routing area of the UE. Such an approach may in certain implementations allow querying the UE to find out if the UE can access services from the home MNO. Further, such behavior makes use of functionalities and messaging that is as tried as the SMS functionality, but may save on system resources, since messaging is exploited that would have to be effected anyway e.g. for location update purposes.

In a second aspect, a method for preparing a roaming operation of a UE between a home network and at least one visited network is provided, the method being performed in the UE and comprising the steps of transmitting at least one message related to the roaming operation indicating that a roaming attempt from the home network to the at least one visited network is about to be performed, and receiving, responsive to the transmitting, deny or grant of access of the UE to the at least one visited network depending on whether the UE has access to the home network or not.

In the second aspect, receiving of deny or grant may be dependent on whether the UE has the possibility to access mobile services of the home network or not. In that case, information may be received that the roaming attempt will be rejected when deny of access to the at least one visited network has been received. In the latter event, responsive to the rejection, an answer SMS message may be transmitted requesting enforced roaming from the home network to the at least one visited network. The transmitting step may be performed in case of insufficient radio coverage in the home network. Finally, responsive to the request for enforced roaming, information may be received that indicates that roaming to the at least one visited network will result in additional mobile service charges.

In a third aspect, a computer program product is provided, the computer program product comprising program code portions for performing any of the method aspects disclosed herein when the computer program product is executed on one or more computing devices (e.g., on the roaming controller and/or UE presented herein). The computer program product may be stored on a computer readable recording medium.

In a fourth aspect, a roaming control entity for preparing a roaming operation of a UE between a home network and at least one visited network is provided, the entity comprising at least one processor being operably connected to a receiver component and a transmitter component, the at least one processor being configured to receive, via the receiver component, at least one message related to the roaming operation, determine if a roaming attempt from the home network to the at least one visited network is performed, and, if the determining operation is affirmative, request, via the transmitter component, the home network for the UE so as to evaluate if the UE has coverage in the home network. The roaming control entity may be a roaming control node or a roaming controller.

In a fifth aspect, a UE for preparing a roaming operation of the UE between a home network and at least one visited network is provided, the UE comprising at least one processor being operably connected to a receiver component and to a transmitter, the at least one processor being configured to transmit, via the transmitter component, at least one message related to the roaming operation indicating that a roaming attempt from the home network to the at least one visited network is about to be performed, and receive, via the receiver component and responsive to the transmitting, deny or grant of access of the UE to the at least one visited network depending on whether the UE has access to the home network or not.

In a sixth aspect, a system is provided, comprising the roaming controller of the fourth aspect and the UE of the fifth aspect.

It is to be noted that the roaming controller and/or the UE (and/or the system) may implement any of the technical details set forth for the method aspect herein. In other words, the roaming controller and/or the UE may comprise further components adapted to perform any of the method steps disclosed herein.

The UE may be any mobile terminal. As an example, the UE may be realized in the form of a mobile (smart-)phone, a notebook computer, a laptop, a subnotebook, a Personal Digital Assistant (PDA), a tablet PC (such as an iPad™), or any hybrids thereof (for example, a Blackberry™ being a hybrid of a smartphone and a PDA), and the like.

BRIEF DESCRIPTION OF THE DRAWINGS

The embodiments are described herein below with reference to the accompanying drawings, in which.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practised in other embodiments that depart from these specific details. For example, the embodiments will primarily be described in the context of the roaming controller and the UE; however, this does not rule out the use of less or more devices to implement the present disclosure.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 1:
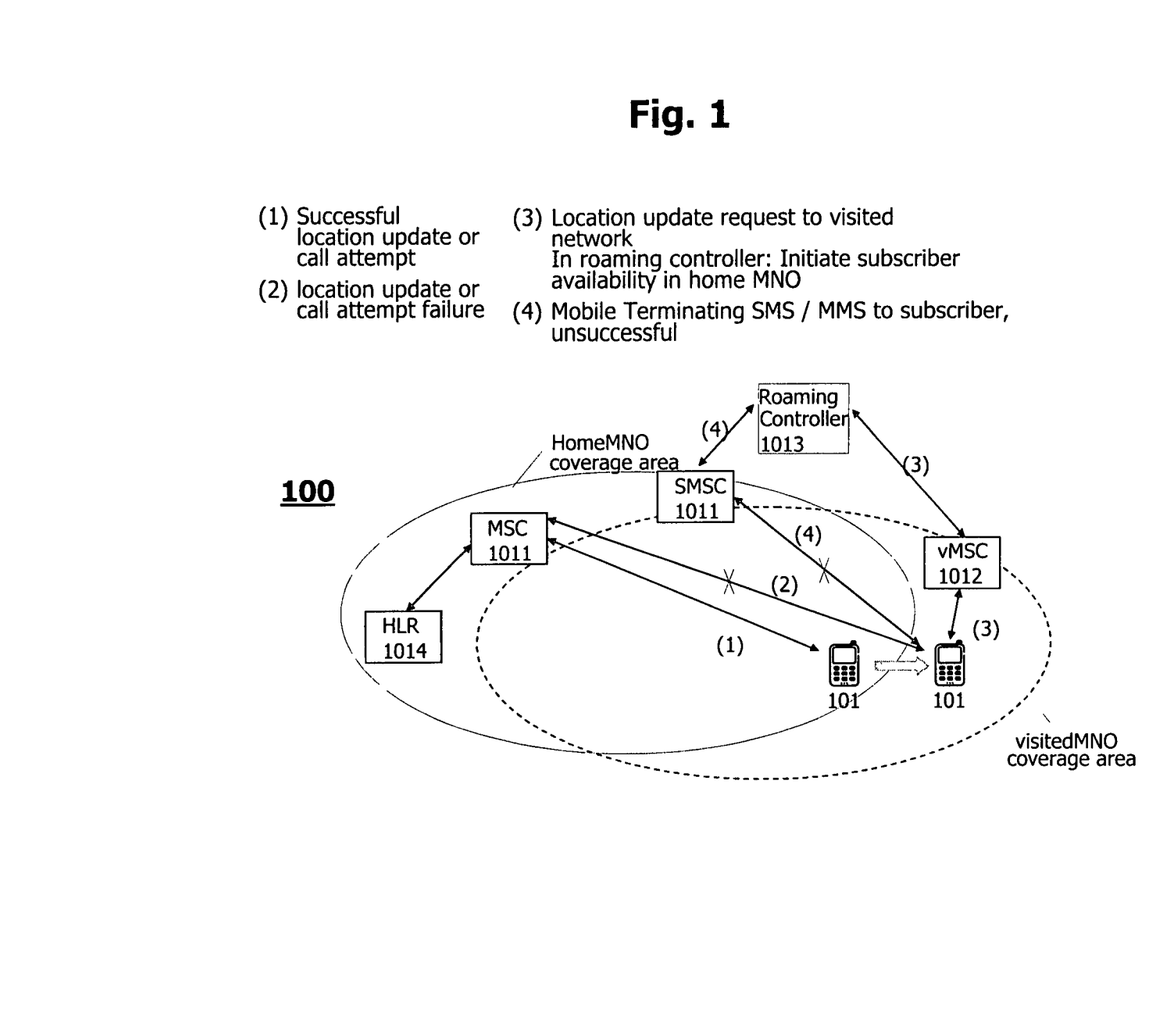
FIG. 1 shows an embodiment of preparing a roaming operation of a UE.

FIG. 1 shows the principle of preparing a roaming operation of a UE according to an exemplary embodiment. As is shown in FIG. 1, a communication network 100 comprises a user equipment (UE) 101, a mobile switching center (MSC) and source MSC (SMSC) 1011, a visited MSC (vMSC) 1012, a roaming controller 1013 and a home location register (HLR) 1014.

In a step (1), the UE 101 is within the radio coverage of its home network 1011 (which may belong to its home MNO) and has access to mobile services via the home network 1011. Home network radio coverage (indicated by a solid line in FIG. 1) is provided by the MSC and/or SMSC 1011, and the UE 101 may be registered in a conventional manner in the HLR 1014. Step (1) may be augmented, for example, by a successful location update or a call attempt.

When transiting to a step (2), as indicated by the bold-printed arrow, the UE 101 may enter a range in which radio coverage of the visited network (indicated by a dashed line in FIG. 1) is at least better than the radio coverage from the home network of the UE 101. Visited network coverage is provided by the vMSC 1012. Step (2) may be augmented by a location update or a call attempt failure.

In a step (3), the UE 101 may perform, for example, a location update request to the visited network (e.g. the vMSC 1012). In turn, in the roaming controller 1013, a request may be issued, for example, to the SMSC 1011 of the home network, in order to initiate a query for subscriber (i.e., UE) availability in the home network (e.g. owned by the home MNO).

In a step (4), depending on the outcome of the availability query, the SMSC 1011 of the home network in conjunction with the roaming controller 1013, may transmit to the UE 101 a message indicating that the roaming operation was unsuccessful (e.g., provided that the UE 101 still has access to mobile services offered by the home MNO). Conversely, the message may indicate that the roaming operation was successful (e.g., provided that the UE 101 is no longer available in the home network, or provided that the UE 101 comprises a setting in mobile subscription data for invalidating the ruling of the roaming controller 1013).

That is, the basic concept of the present embodiment may be incorporated in a unit 1013 referred to as roaming control node (or roaming controller) herein that may be enabled to enhance roaming functionality. This unit 1013 may be part of the roaming setup either in one of the MNOs network or in a dedicated roaming service network. The unit 1013 may receive the roaming related signaling (such as location update message) and if an attempt to roam from the home MNO to the visited MNO is made, the unit 1013 may initiating a query of the subscriber (i.e., UE 101) in its home network, to find out if the UE 101 still has radio coverage from the home network.

At least two alternatives are possible to determine the UE's possibility to access mobile services (e.g., if the UE is reachable) in his home network:
  Query the subscriber via SMS/MMS (Alternative 1)
  Query the subscriber by positioning procedures (Alternative 2).

In alternative 1, in order to check the UE status, e.g., via SMS or MMS, the roaming controller 1013 may connect to the (local) SMS service center for example by means of a binary SMS or a flash SMS. If the SMS/MMS is delivered successfully to the UE 101, it can be assumed that the UE 101 can still access the home network. At the same time, the SMS delivered to the UE 101 can inform the UE 101 (i.e., the associated subscriber), that a roaming attempt will be rejected. Advantageously, this may be enhanced by allowing the UE to enforce roaming by answering to the SMS, e.g., in case of instable and poor radio conditions. This SMS/MMS communication may as well be used to inform the subscriber that additional charges apply.

In case the SMS is delivered successfully to the UE 101 and a corresponding message is returned to the roaming controller 1013, the attempt for roaming may be rejected (or alternatively be executed, if this option has been chosen by the subscriber operating the UE 101). In case the SMS is not delivered to the UE 101 (e.g., within a predefined time period) the roaming may be allowed and the signaling towards the visited MNO (e.g., vMSC 1012) will be continued.

All the above processing checks may only be executed for a predefined group of MNOs, which have overlapping service areas. As mentioned above, it is to be noted that instead of the SMS, also the MMS may be used.

If alternative 2 is chosen, the UE 101 may be positioned via existing positioning procedures, in which the roaming controller 1013 may request the position of the UE 101 from the home network for example via the mobile application part (MAP) message Provide Subscriber Location (or a similar message depending on the positioning method used) and subsequent paging of the UE 101 in the last known location or routing area of the UE 101.

Similar to the first alternative, roaming may be permitted if the positioning response indicates that the UE 101 is no longer connected in the home network, and may be rejected if the response indicates that the UE 101 is reachable in the home network.

Figure 2A:
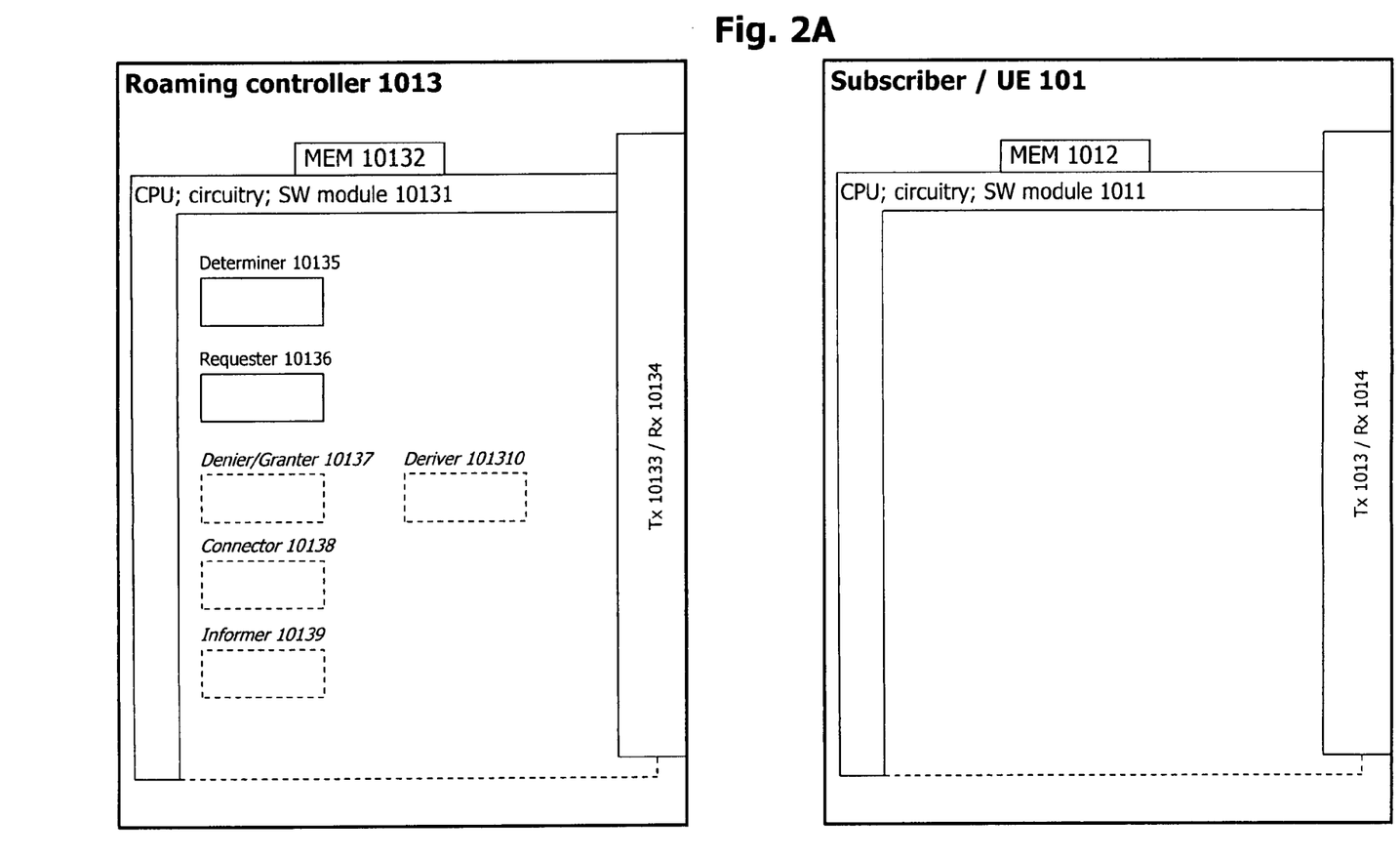
FIG. 2A shows the components comprised in a first embodiment of a roaming controller and a UE.
Figure 2B:
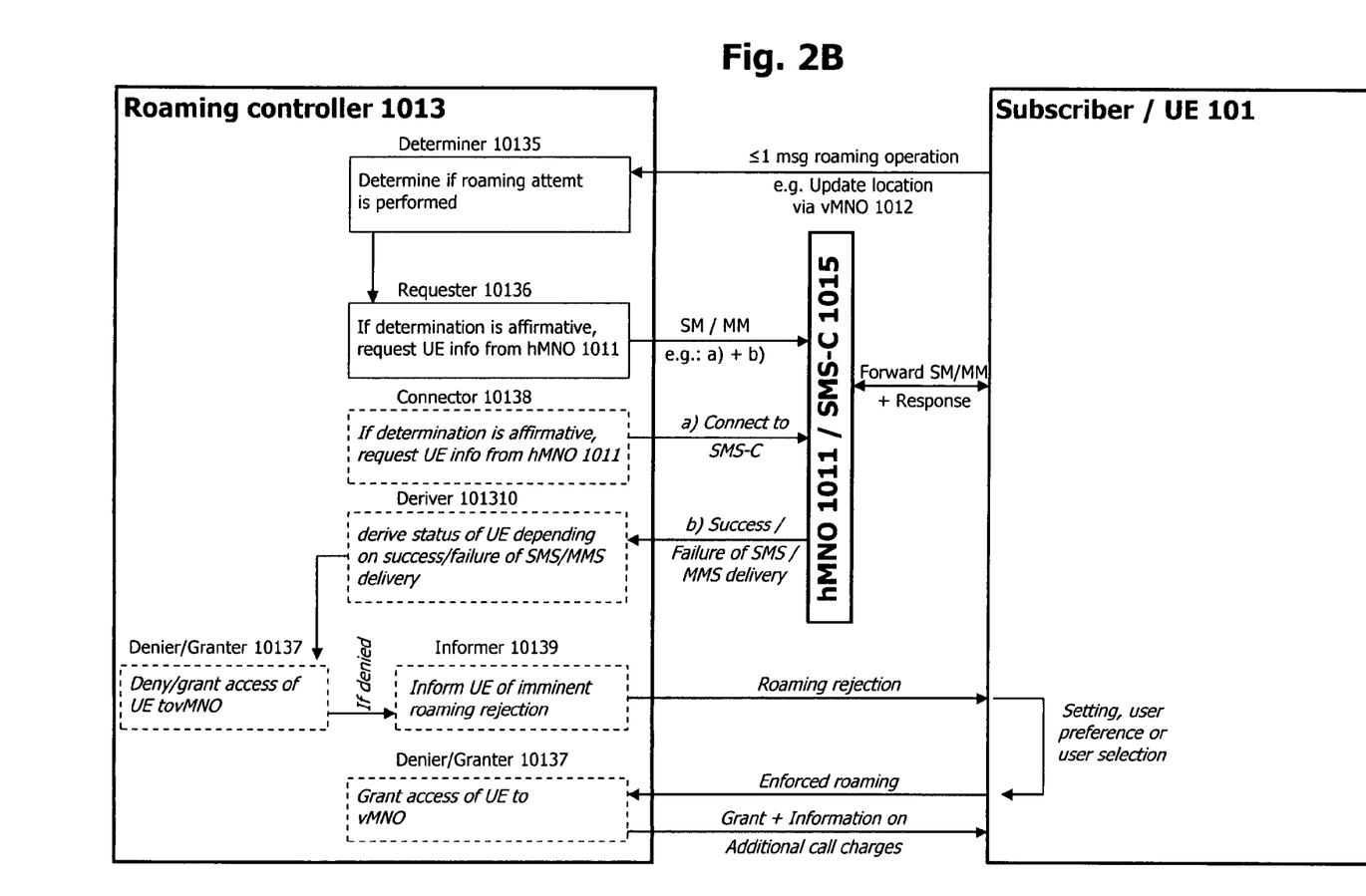
FIG. 2B shows the interaction between the components of the entities of FIG. 2A.

FIGS. 2A and 2B show a first embodiment of a roaming controller 1013 and a UE 101 for preparing a roaming operation of the UE 101. FIG. 2A illustrates the components comprised in the roaming controller 1013 and the UE 101, and FIG. 2B shows the interaction between the components of the roaming controller 1013 and the UE 101.

As shown in FIG. 2A, the roaming controller 1013 comprises a core functionality (e.g. a central processing unit (CPU), a dedicated circuitry or a software module) 10131, a memory (and/or database) 10132, a transmitter 10133 and a receiver 10134. In turn, the roaming controller 1013 comprises a determiner 10135, a requester 10136, an optional denier or granter 10137, an optional connector 10138, an optional informer 10139 and an optional deriver 101310.

Further, the UE 101 comprises a core functionality 1011, a memory (or database) 1012, a transmitter 1013 and a receiver 1014.

As indicated by the dashed extensions of the functional blocks of the CPUs 10$x$1 ($x$=13 and/or 1), the determiner 10135, the requester 10136, the denier/granter 10137, the connector 10138, the informer 10139 and the deriver 101310 (of the roaming controller 1013), as well as the memory 10$x$2, the transmitter 10$x$3 and the receiver 10$x$4 may at least partially be functionalities running on the CPUs 10$x$1, or may alternatively be separate functional entities or means controlled by the CPU 10$x$1 and supplying the same with information.

The CPUs 10$x$1 may be configured, for example by software residing in the memories 10$x$2, to process various data inputs and to control the functions of the memory 10$x$2, the transmitter 10$x$3 and the receiver 10$x$4 (as well as the determiner 10135, the requester 10136, the denier/granter 10137, the connector 10138, the informer 10139 and the deriver 101310 (of the roaming controller 1013). The memory 10$x$2 may serve for storing code means for carrying out the methods according to the aspects disclosed herein, when run on the CPU 10$x$1.

It is to be noted that the transmitter 10$x$3 and the receiver 10$x$4 may alternatively be provided as an integral transceiver, as is shown in FIG. 2A. It is further to be noted that the transmitters/receivers may be implemented as physical transmitters/receivers for transceiving via an air interface (e.g., between the network roaming controller 1013 and the UE 101), as routing entities/interfaces between network elements (e.g., for transmitting/receiving data packets between roaming controller 1013 and hMNO 1011/vMNO 1012 when disposed as separate network functionalities), as functionalities for writing/reading information into/from a given memory area (e.g., between roaming controller 1013 and hMNO 1011/vMNO 1012 when disposed as an integral network entity) or as any suitable combination of the above. At least one of the above-described determiner 10135, requester 10136, denier/granter 10137, connector 10138, informer 10139 and deriver 101310 (of the roaming controller 1013), or the respective functionalities carried out, may also be implemented as a chipset, module or subassembly.

Figure 3:
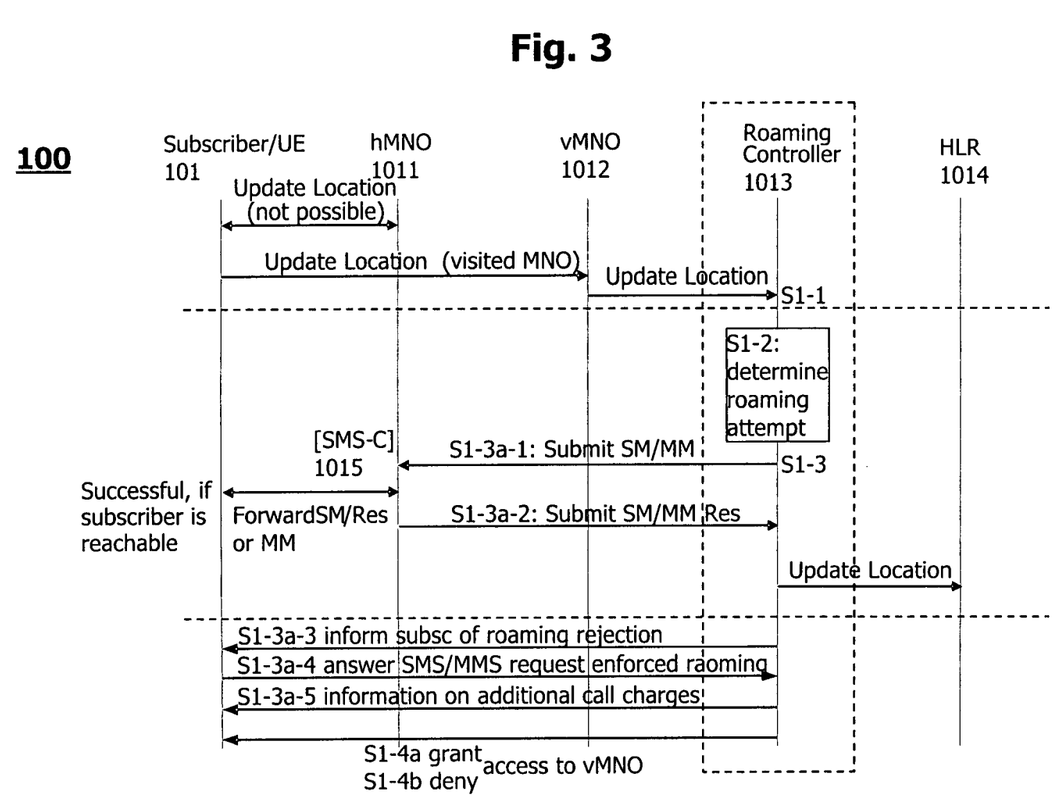
FIG. 3 shows a method according to the first embodiment for preparing a roaming operation of a UE.

FIG. 3 illustrates the first embodiment in the form a method for preparing a roaming operation of a user equipment (UE) 101. In the signalling diagram of FIG. 3, signalling between elements is indicated in the horizontal direction, while time aspects between signalling are reflected in the vertical arrangement of the signalling sequence as well as in the sequence numbers. It is to be noted that the time aspects indicated in FIG. 3 do not necessarily restrict any one of the method steps shown to the step sequence outlined in FIG. 3. This applies in particular to method steps that are functionally disjunctive with each other; for example, it is immaterial whether the optional "Update location" step between roaming controller 1013 and HLR 1014 takes place before, during or after steps 1-3$a$-3 to S1-3$a$-5. Likewise, grant/deny of access to the vMNO 1012 in step S1-4 also may happen before steps S1-3$a$-5 (e.g. if other conditions for grant/deny have already been met, as will be explained herein below).

Referring still to the signalling diagram of FIG. 3 (to be read along with the roaming controller 1013 and UE 101 shown in FIGS. 2A and 2B), as optional preparatory step, the UE 101 and the home network 1011 may negotiate that a location update is not possible with the home network 1011. In a further preparatory step, the transmitter 1013 of the UE 101 may transmit a location update message to the (potentially) visited network 1012. In turn, the transmitter 1013 of the UE 1 transmits at least one message (which may take the form of the location update message) related to the roaming operation indicating that a roaming attempt from the home network 1011 to at least one visited network 1012 is about to be performed.

Thus, in a step S1-1, the receiver 10134 of the roaming controller 1013 receives the at least one message related to the roaming operation (which message may take the form of the above-defined location update message). Then, in a step S1-2, the determiner 10135 of the roaming controller 1013 determines if a roaming attempt from the home network 1011 to at least one visited network 1012 is performed. And, in a step S1-3, the requester 10136 of the roaming controller 1013 requests, if the determining step is affirmative, from the home network 1011 information relating to the UE so as to evaluate if the UE 101 has access to the home network 1011. Accordingly, it can be ascertained that the roaming entity can make an informed decision whether the UE 101 actually is in need of a roaming operation.

Furthermore, at least the steps of determining S1-2 and requesting S1-3 may be performed under the prerequisite that a plurality of mobile networks with overlapping service areas is pre-defined, and wherein the plurality of mobile networks comprises the home and at least one visited networks. Further, the requesting step S1-3 may comprise determining whether the UE has the possibility to access mobile services in the home network. In the latter case, the requesting step S1-3 may comprise requesting information on whether the UE is reachable from the home network. Accordingly, the subscriber of the UE 101 can be sure that he/she always gets access to his/her home network 1011 (in which he/she may have subscribed for a flat-rate mobile services fee) if possible, and can at least choose the cheapest MNO to roam to if access to his/her home network is not possible.

As an optional aspect, the requesting step may comprise a step S1-3$a$ of transmitting a Short Message Service, SMS, message to the home network 1011 (the SMS message may take the form of, for example, a SMS message containing binary coded information or a flash SMS). In this case, the transmitting step may further comprise a step S1-3$a$-1 for connecting to a home SMS service center 1015. In turn, the home network 1011 may forward the received SMS to the UE 101 and wait for a corresponding response. Based on the response, the home network 1011 may submit the SMS delivery result to the roaming controller 1013 so as to perform a step S1-3$a$-2 for deriving a status of the UE 101 depending on a delivery success result from the home SMS center 1015. That is, the roaming controller 1013 may interpret the SMS response in the following way: failure of delivery of the SMS message may indicate non-accessibility of the home network by the UE, and failure of delivery may be indicated, for example, by elapsing of a predetermined time period from the SMS message transmittal without receiving any response. Finally, in a step S1-4$a$, the denier/granter 10137 of the roaming controller 1013 may perform granting access of the UE to the at least one visited network when failure of delivery is indicated. As mentioned above, it is to be noted that instead of the SMS, also the MMS may be used.

Accordingly, the UE 101 and the networks involved may rely on the simple and tried SMS technology for realizing the present embodiment; furthermore, it is ascertained that the home network 1011 is really not reachable from the current location of the UE 101, since failing of SMS service, being one of the most generic services, clearly indicates that also higher-level services (starting with a voice call) will surely not work either.

On the other hand, successful delivery of the SMS message may indicate accessibility of the home network by the UE. In this case, in step S1-3a-3, the informer 10139 of the roaming entity 1013 may inform the UE 101 that the roaming attempt will be rejected, which information may be received by the receiver 1014 of the UE 101. In addition to that information, the receiver 1014 of the UE 101 may receive information that the roaming attempt will be rejected when deny of access to the at least one visited network has been received. Accordingly, the subscriber of the UE 101 is given an alert that he/she is not entitled for a roaming operation (implicitly, this means that the home network 101 is still reachable). As mentioned above, it is to be noted that instead of the SMS, also the MMS may be used.

Depending on the choice of the subscriber of the UE 101, in a step S1-3a-4, the transmitter 1013 of the UE 101 may transmit, responsive to the rejection, an answer SMS message requesting enforced roaming from the home network to the at least one visited network, which answer SMS message may be received by the receiver 10134 of the roaming controller 1013 in the same step S1-3a-4. This transmitting step (and the corresponding receiving step) may be performed in case of insufficient radio coverage in the home network. Accordingly, this gives the subscriber of the UE 101 the opportunity to overrule or invalidate the ruling of the roaming controller 1013 if he/she, for example, is in need for an undisturbed mobile service (and is willing to take into account the negative effects involved in roaming). As mentioned above, it is to be noted that instead of the SMS, also the MMS may be used.

Further, in a step S1-3a-5, the transmitter 10133 of the roaming controller 1013 may transmit, responsive to the request for enforced roaming, information indicating that roaming to the at least one visited network 1012 will result in additional mobile service charges, which information may be received by the receiver 1014 of the UE 101 in the same step S1-3a-5. Accordingly, the subscriber of the UE 101 is at least warned about the costs involved in roaming.

Finally, in step S1-4a or S1-4b, the denier/granter 10137 may deny/grant access of the UE 101 to the at least one visited network 1012 when the UE 101 has access to the home network 1011. When taking into account above steps S1-3a-3 to S1-3a-5, the subscriber of the UE 101 may also force the roaming controller 1013 to grant access to the visited network 1012. Alternatively, the granting step may be made conditional on a corresponding setting of the UE data (e.g., the subscriber may adjust the UE or subscription settings so that roaming may be performed although the home network 1011 would still be reachable). Accordingly, the receiver 1014 of the UE 101 may receive, responsive to the transmitting in step S1-1, deny or grant of access of the UE 101 to the at least one visited network 1012 depending on whether the UE 101 has access to the home network or not.

Figure 4A:
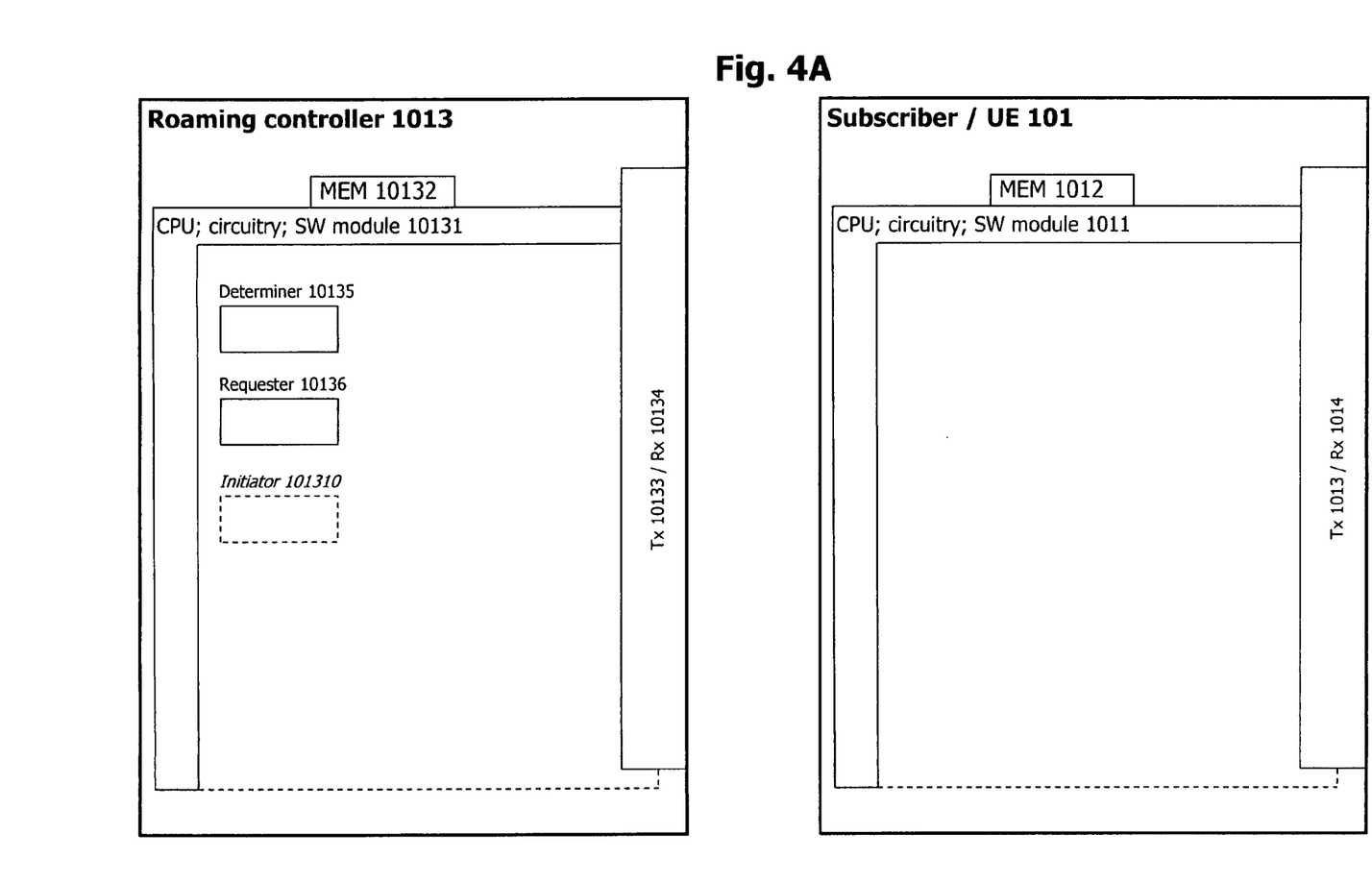
FIG. 4A shows the components comprised in a second embodiment of a roaming controller and a UE.
Figure 4B:
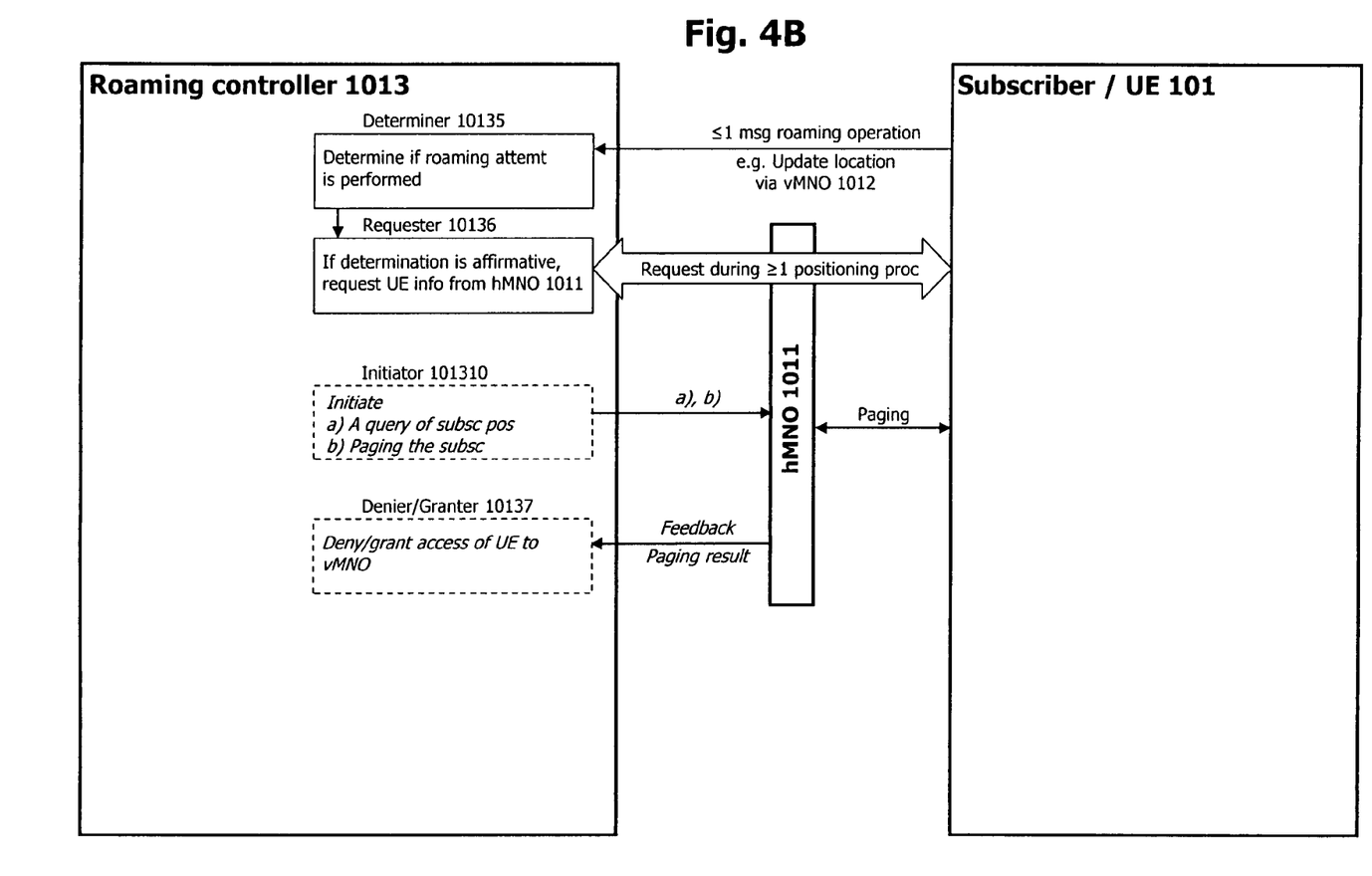
FIG. 4B shows the interaction between the components of the entities of FIG. 4A.
Figure 5:
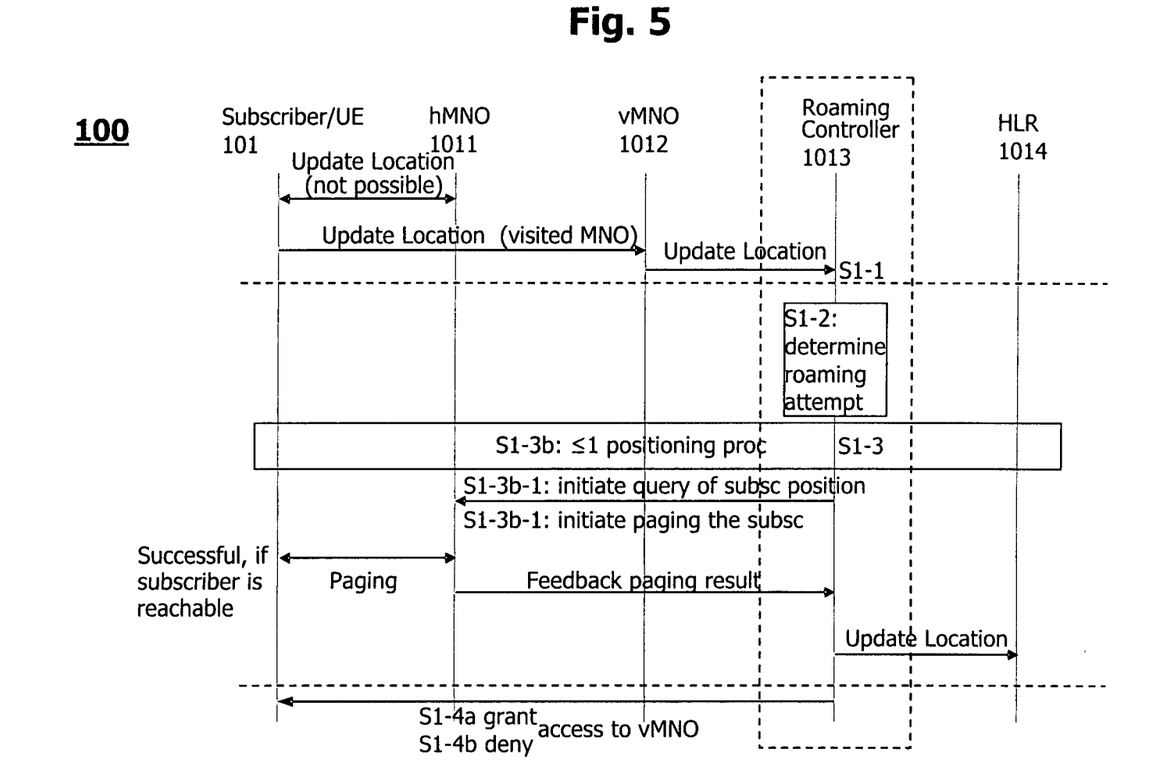
FIG. 5 shows a method according to the second embodiment for preparing a roaming operation of a UE.

FIGS. 4A and 4B show a second embodiment of the roaming controller 1013 and the UE 101 for preparing a roaming operation of a UE. FIG. 4A illustrates the components comprised in the roaming controller 1013 and the UE 101, and FIG. 4B shows the interaction between the components of the roaming controller 1013 and the UE 101. FIG. 5 shows the method aspect of the second embodiment.

Furthermore, as shown in FIG. 4A, the roaming controller 1013 may further comprise an optional initiator 101310, which may also be controlled by and/or may be part of the CPU 10131. Likewise, also the initiator 101310 may be implemented as a chipset, module or subassembly.

As apparent from FIGS. 4A, 4B and 5, the steps S1-1, S1-2 and S1-4 (receiving, determining and granting/denying by the roaming controller 1013) are identical to the first embodiment. Insofar those steps are concerned, reference is made to the first embodiment.

As an alternative to the SMS-based messaging, in a step S1-3b, the requesting step may be involved in performing at least one positioning procedure with the home network. In detail, in a step S1-3b-1, the initiator 101310 of the roaming device may initiate a query, from the home network 1011, of the UE position, and may, in a step S1-3b-2, initiate paging of the UE. As mentioned above, this behaviour may exploit functionalities that are involved in necessary positioning procedures, thus saving on system resources.

For example, the query step may be performed via a Mobile Application Part, MAP, message Provide Subscriber Location. In addition, it may be performed in the last known location area or routing area of the UE. Thus, existing message formats can be reused.

As has become apparent from the embodiments described hereinabove, the technique presented herein brings about one or more of the following advantages. One advantage for the MNO is that the MNO can allow certain services to be offered more reliably and to extend the coverage for its customers (subscribers). At the same time, participating MNOs may increase their revenue, since they will extend the network coverage and provided the subscriber is accepting to roam. As for the subscriber, provided that he/she is willing to pay the connected supplement, he/she will be able to access mobile services beyond coverage of the home network. Moreover, the UE is prevented from accidental (e.g., international) roaming, when moving around close to country borders and when the radio coverage in the foreign MNO may be better, even though they still have acceptable radio coverage from the home network.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for preparing a roaming operation of a user equipment between a home network and at least one visited network, the method performed in a roaming control entity and comprising:
   receiving at least one message related to the roaming operation;
   determining if a roaming attempt from the home network to the at least one visited network is performed; and
   based on the determining that the roaming attempt is being performed, requesting, from the home network, information relating to the user equipment so as to evaluate if the user equipment has access to the home network,
   wherein the requesting comprises:
   generating a Short Message Service, SMS, message or Multimedia Message Service, MMS, message at the roaming control entity;
   transmitting the SMS or MMS message to the home network, the method further comprising:
   connecting to a home SMS service center; and deriving a status of the user equipment based on a delivery success result of the SMS or MMS message from the home SMS service center, wherein failure of delivery of the SMS or MMS message indicates non-accessibility of the home network by the user equipment and successful delivery of the SMS or MMS message indicates accessibility of the home network by the user equipment;

granting the user equipment access to the at least one visited network responsive to failure of delivery of the SMS or MMS message being indicated;

informing the user equipment that the roaming attempt is rejected responsive to successful delivery of the SMS or MMS message indicated;

receiving, responsive to the rejection, an answer SMS message from the user equipment requesting enforced roaming from the home network to the at least one visited network; and transmitting, responsive to the request for enforced roaming, information indicating that roaming to the at least one visited network will result in additional mobile service charges.

2. The method according to claim 1, further comprising, after the requesting step, denying access of the user equipment to the at least one visited network when the user equipment has access to the home network.

3. The method according to claim 1, further comprising, after the requesting step, granting access of the user equipment to the at least one visited network when the user equipment has no access to the home network.

4. The method according to claim 3, wherein the granting step is made conditional on a corresponding setting of the user equipment data.

5. The method according to claim 1, wherein at least the steps of determining and requesting are performed under the prerequisite that a plurality of mobile networks with overlapping service areas is pre-defined, and wherein the plurality of mobile networks comprises the home and at least one visited networks.

6. The method according to claim 1, wherein the message related to roaming is a location update message.

7. The method according to claim 1, wherein the requesting step comprises determining whether the user equipment has the possibility to access mobile services in the borne network.

8. The method according to claim 7, wherein the requesting step comprises requesting information on whether the user equipment is reachable from the home network.

9. The method according to claim 1, wherein the connecting step is performed by transmitting a SMS message containing binary coded information.

10. The method according to claim 1, wherein the connecting step is performed by transmitting a flash SMS.

11. The method according to claim 1, wherein failure of delivery is indicated by elapsing of a predetermined time period from the SMS message transmittal without receiving any response.

12. The method according to claim 1, wherein the requesting step further comprises performing at least one positioning procedure with the home network, the performing further comprising:

initiating a query, from the roaming control entity to the home network, of the use equipment position; and initiating paging of the user equipment.

13. The method according to claim 12, wherein the query step is performed via a Mobile Application Part, MAP, message Provide Subscriber Location.

14. The method according to claim 12, wherein the paging step is performed in the last known location area of the user equipment.

15. The method according to claim 12, wherein the paging step is performed in the last known routing area of the user equipment.

16. A computer program product comprising a non-transitory computer readable recording medium having program code portions embodied thereon for performing the method of claim 1 when the program code portions are executed on one or more computing devices.

17. A roaming control entity for preparing a roaming operation of a user equipment between a home network and at least one visited network, the entity comprising at least one processor being operably connected to a receiver component and a transmitter component, the at least one processor being configured to perform operations comprising:

receiving, via the receiver component, at least one message related to the roaming operation;

determining if a roaming attempt from the home network to the at least one visited network is performed; and based on the determining that the roaming attempt is being performed, requesting, via the transmitter component the home network for the user equipment so as to evaluate if the user equipment has coverage in the home network, wherein, the requesting comprises:

generating Short Message Service, SMS, message or Multimedia Message Service, MMS, message at the roaming control entity;

transmitting the SMS or MMS message to the home network, the operations further comprising:

connecting to a home SMS service center; and deriving a status of the user equipment based on a delivery success result of the SMS or MMS message from the home SMS service center, wherein failure of delivery of the SMS or MMS message indicates non-accessibility of the home network by the user equipment and successful delivery of the SMS or MMS message indicates accessibility of the home network by the user equipment;

granting the user equipment access to the at least one visited network responsive to failure of delivery of the SMS or MMS message being indicated; and informing the user equipment that the roaming attempt is rejected responsive to successful delivery of the SMS or MMS message being indicated;

receiving, responsive to the rejection, an answer SMS message from the user equipment requesting enforced roaming from the home network to the at least one visited network; and transmitting, responsive to the request for enforced roaming, information indicating that roaming to the at least one visited network will result in additional mobile service charges.

18. The roaming control entity according to claim 17 being a roaming control node.

19. The roaming control entity according to claim 17 being a roaming controller.

* * * * *